United States Patent
Yin et al.

(10) Patent No.: US 7,289,409 B2
(45) Date of Patent: Oct. 30, 2007

(54) METHOD FOR PROCESSING A WOBBLE SIGNAL

(75) Inventors: Bin Yin, Eindhoven (NL); Cornelis Marinus Schep, Eindhoven (NL); Aalbert Stek, Eindhoven (NL); Alexander Padiy, Eindhoven (NL); Theodorus Petrus Henricus Gerardus Jansen, Eindhoven (NL); Mohammed Meftah, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 0 days.

(21) Appl. No.: 10/527,894

(22) PCT Filed: Sep. 5, 2003

(86) PCT No.: PCT/IB03/03913

§ 371 (c)(1),
(2), (4) Date: Mar. 15, 2005

(87) PCT Pub. No.: WO2004/027768

PCT Pub. Date: Apr. 1, 2004

(65) Prior Publication Data

US 2005/0270967 A1    Dec. 8, 2005

(30) Foreign Application Priority Data

Sep. 18, 2002  (EP) ................................. 02292290
Jun. 19, 2003  (EP) ................................. 03300034

(51) Int. Cl.
    G11B 15/64    (2006.01)
(52) U.S. Cl. ................. 369/53.34; 369/59.22; 369/59.21
(58) Field of Classification Search ............ 369/53.34, 369/59.21, 59.22
    See application file for complete search history.

(56) References Cited

U.S. PATENT DOCUMENTS

| 4,866,688 | A | * | 9/1989 | Ohtake et al. ............ 369/44.13 |
| 5,434,834 | A | * | 7/1995 | Shinoda et al. .......... 369/44.13 |
| 5,631,892 | A | * | 5/1997 | Bakx ....................... 369/124.12 |
| 5,892,740 | A | * | 4/1999 | Nagasawa et al. ........ 369/44.26 |
| 6,175,540 | B1 | * | 1/2001 | Kim ........................ 369/44.35 |
| 6,507,544 | B1 | * | 1/2003 | Ma et al. .................. 369/44.41 |
| 6,781,104 | B1 | * | 8/2004 | Braat ....................... 250/201.5 |
| 7,110,333 | B2 | * | 9/2006 | Oh ........................... 369/47.22 |
| 2002/0036997 | A1 | * | 3/2002 | Kim et al. .................. 370/335 |
| 2003/0095481 | A1 | * | 5/2003 | Williams et al. .......... 369/47.28 |
| 2007/0053261 | A1 | * | 3/2007 | Frisson et al. ............ 369/47.28 |
| 2007/0097826 | A1 | * | 5/2007 | Iimura et al. ............. 369/53.34 |

* cited by examiner

Primary Examiner—Wayne Young
Assistant Examiner—Linh T. Nguyen

(57) ABSTRACT

A wobble signal is generated from at least two elementary signals (A,B,C,D) detected by scanning a wobbled track of a data carrier. The invention proposes a solution for eliminating the noise of various origins in the wobble signal, notably the high frequency data leakage into the wobble signal due to radial asymmetry introduced in the diffraction pattern on the detector, whatever the reason for this radial asymmetry. According to the invention, the at least two elementary signals are filtered with at least an adaptive filter (40), and said filtered elementary signals are subtracted (44) from said wobble signal (PP) thereby generating an improved wobble signal.

8 Claims, 3 Drawing Sheets

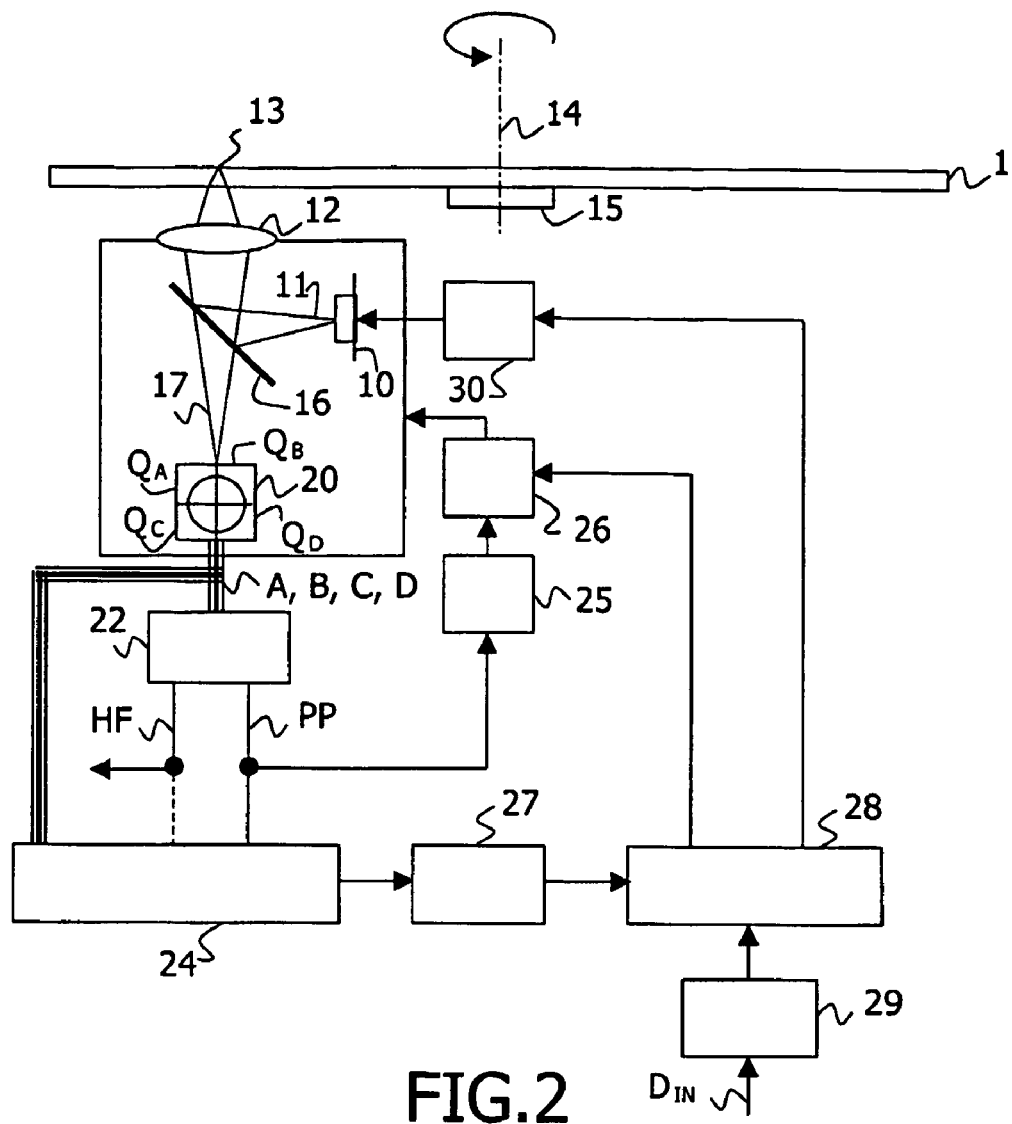
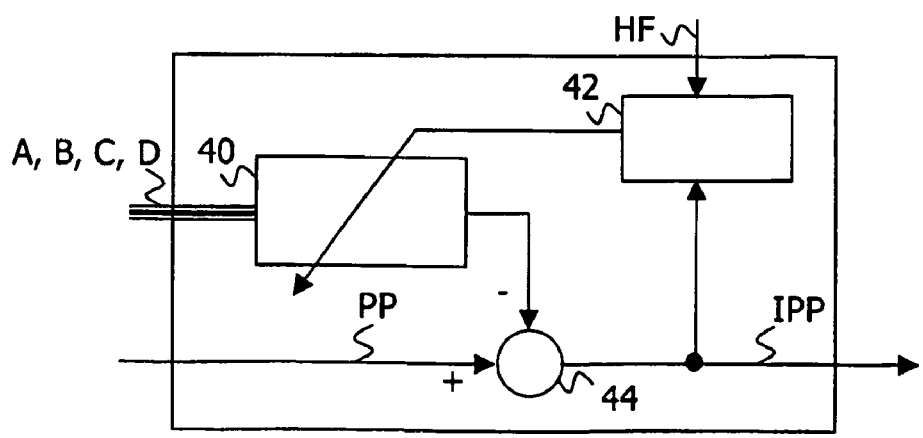
FIG.2
FIG.3

METHOD FOR PROCESSING A WOBBLE SIGNAL

FIELD OF THE INVENTION

The invention relates to an apparatus for reading and/or writing data from and/or onto a data carrier, said data carrier containing wobbled tracks, said apparatus having scanning means for scanning said tracks, detection means for detecting at least two elementary signals when scanning said tracks, and wobble recovery means for generating a wobble signal from said at least two elementary signals.

The invention also relates to an optical unit having scanning means for scanning wobbled tracks of a data carrier, detection means for detecting at least two elementary signals when scanning said tracks, and wobble recovery means for generating a wobble signal from said at least two elementary signals.

The invention also relates to a wobble processing method for processing a wobble signal generated from at least two elementary signals detected by scanning a wobbled track of a data carrier.

The invention also relates to a program comprising instructions for implementing such a wobble processing method when said program is executed by a processor.

The invention applies to any data carrier format using wobbled tracks. For example, it applies to inscribable and re-inscribable optical discs in which the tracks are wobbled, like DVD+RW, DVD+R, DVD-RW, Blu-Ray . . .

BACKGROUND OF THE INVENTION

U.S. Pat. No. 5,631,892 deals with the deterioration of the wobble/noise ratio due to a deviation in the positioning of the detector. A solution is described to cancel the resulting noise. It consists in adjusting a weighting ratio between the two signals that are detected and that contribute to the wobble signal so as to make the DC component of the wobble signal equal to zero. This solution is based on the assumption that the noise component in the wobble signal is proportional to the deviation of the detector position.

This assumption cannot be held for some types of aberrations that also lead to radial asymmetry in the two halves of the detector, and therefore to a leakage of data in the wobble signal.

An object of the invention is to propose a solution for eliminating the noise of various origins in the wobble signal, notably the high-frequency data leakage into the wobble signal due to radial asymmetry introduced in the diffraction pattern on the detector, whatever the reason for this radial asymmetry.

SUMMARY OF THE INVENTION

This is achieved with an apparatus for reading and/or writing data from and/or onto a data carrier as claimed in claim 1, with an optical unit as claimed in claim 5, with a wobble processing method as claimed in claim 8, and with a program as claimed in claim 11.

The invention uses at least one adaptive filter for filtering the elementary signals that are detected by said detection means and generates an improved wobble signal by subtracting said filtered elementary signals from said wobble signal.

The invention works adaptively and it allows to cancel any noise originating from high-frequency data written on tracks over the full bandwidth regardless of the spectral relationship between the noise signal and the wobble signal. The only assumption made in the invention is that the noise signal is a filtered version of the data signal.

In a first embodiment of the invention, data recovery means are provided for generating a data signal from said at least two elementary signals, and the adaptive filter uses filtering coefficients chosen so as to minimize the cross-correlation between said improved wobble signal and said data signal. In this embodiment the adaptation is driven by a decorrelation mechanism. With this embodiment any undesired signal can be removed from the wobble signal as far as the pure wobble signal is uncorrelated with this undesired signal.

In a second embodiment of the invention, the adaptive filter uses filtering coefficients chosen so as to minimize the difference between a scaled version of the improved wobble signal and a reference wobble signal reconstructed on the basis of the generated wobble signal. In this second embodiment an undesired signal may be removed from the wobble signal even if correlated to the wobble signal. This embodiment is more complex and it introduces a delay because the reference wobble signal has to be reconstructed on the basis of the results of the wobble detection before the adaptation starts.

BRIEF DESCRIPTION OF THE DRAWINGS

These and other aspects of the invention are further described with reference to the following drawings:

FIG. 2 is an example of an apparatus according to the invention for reading and/or writing data from and/or onto a data carrier, FIG. 3 is a block diagram of a first embodiment of a wobble processing circuit according to the invention.

DESCRIPTION OF PREFERRED EMBODIMENTS

Figure 1A:
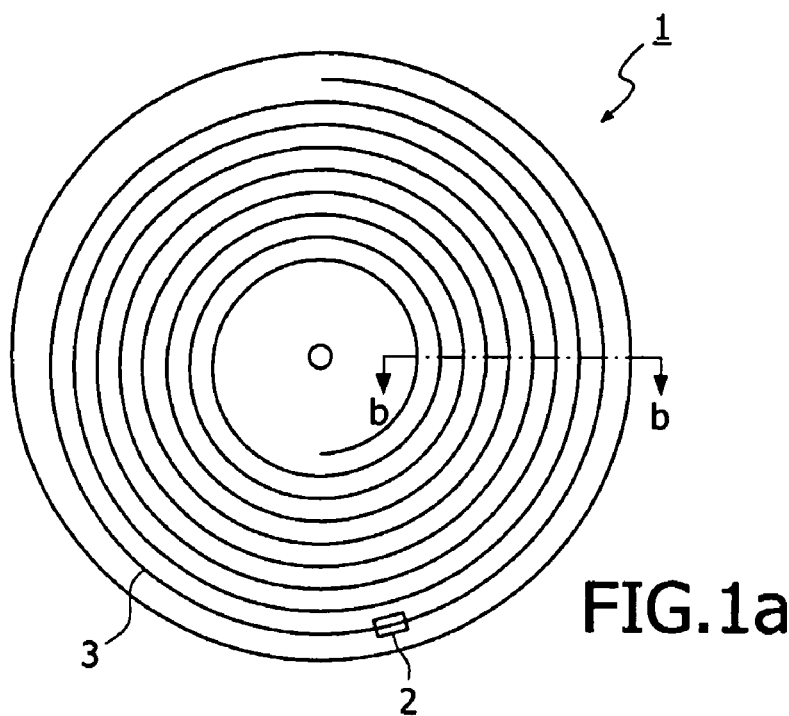
FIG. 1 is a schematic representation of a data carrier having wobbled tracks.
Figure 1B:
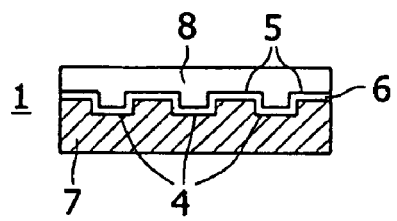
Figure 1C:
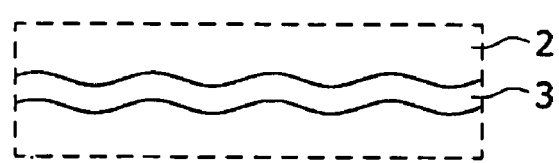

FIG. 1 shows an inscribable data carrier 1, FIG. 1A being a plan view, FIG. 1B showing a small part in a sectional view taken on a line b-b, and FIG. 1C showing a portion 2 of the data carrier in a larger scale. The data carrier 1 of FIG. 1 is a disc having tracks forming each a 360° turn of a spiral line 3. Each track comprises a groove 4 and a land 5. For the purpose of recording data, the data carrier has a recording layer 6 which is deposited on a transparent substrate 7 and which is covered by a protective coating 8. The data are recorded in the grooves 4. The tracks are scanned by a radiation beam that enters the data carrier through the substrate 7.

As represented in FIG. 1C, the tracks have a continuous sinusoidal deviation from their average centerline. This sinusoidal deviation is called wobble. In some implementations, the wobble is used for tracking (keeping the spot on the tracks) as an alternative to the known "one-spot push-pull" or "3-spot push-pull" methods. This is not mandatory. In some standards, the wobble is modulated to carry addressing information. For example in DVD+RW, DVD+R and DVR (Blue-Ray) the wobble is phase-modulated. In DVD-RW it is frequency modulated.

FIG. 2 shows an example of apparatus for reading/writing data from/onto the data carrier 1. The apparatus of FIG. 2 comprises a radiation source 10, for example a semiconductor laser. The radiation source 10 generates a beam 11 that is directed onto a track of the data carrier 1 by means of an optical system comprising, inter alia, a focusing objective 12. The beam 11 produces a small spot 13 on the data carrier 1. For the spot 13 to scan the tracks, the data carrier is rotated about a shaft 14 by a motor 15 in a conventional manner. The beam 11 is reflected by the data carrier 1. The projected and reflected beams are separated one from the other by a beam splitter 16 (for example a partially transparent mirror). The reflected radiation beam 17 is passed on to a quadruple photo detector 20 having a radiation-sensitive surface divided into four quadrants $Q_A$, $Q_B$, $Q_C$ and $Q_D$.

The detector 20 generates four photocurrents A, B, C and D (also called elementary signals) corresponding to the power of the radiation incident on each of the four quadrants of the radiation-sensitive surface. These four elementary signals A, B, C, D are passed on to data/wobble recovery means 22. They are also passed on to a wobble processing circuit 24 in accordance with the invention. The data/wobble recovery means 22 generate a data signal HF=A+B+C+D, and a difference signal PP=A+B−C−D.

The data signal HF is passed on to the wobble processing circuit 24 in certain embodiments of the invention, as will be apparent in the following of the description.

The difference signal PP is passed on to a low-pass filter 25 which blocks the signal components caused by the wobble (the signal components caused by the wobble are beyond the tracking bandwidth). After filtering the difference signal is fed to a servo circuit 26 responsible for controlling the position of the spot 13 in a direction perpendicular to the direction of the tracks (the servo circuit 26 controls either the position of the optical system or the position of the focusing objective 12).

The difference signal PP is also passed on to the wobble processing circuit 24. The wobble processing circuit 24 generates an improved wobble signal IPP from which the data-to-wobble crosstalk has been removed. The improved wobble signal IPP is passed on to a demodulation circuit 27 responsible for extracting the addressing information carried by the wobble signal. This addressing information is passed on to a microprocessor 28. This addressing information is used, for example, by the microprocessor 28 to derive the current position of the spot 13 on the data carrier 1. During reading, erasing, or writing, the microprocessor 28 can compare the current position of the spot 13 with a desired position and determine parameters for a jump of the optical system to the required position. The parameters of the jump are fed to the servo circuit 26.

The data $D_{IN}$ to be written on the data carrier 1 are modulated by a modulation circuit 29 and fed to the microprocessor 28. The microprocessor 28 synchronizes the data $D_{IN}$ with the addressing information generated by the demodulation circuit 27 and generates a control signal passed on to a source control unit 30. The source control unit 30 controls the optical power of the beam 11 emitted by the radiation source 10, thereby controlling the formation of marks in the grooves of the data carrier 1.

FIG. 3 is a block diagram of a first embodiment of a wobble processing circuit according to the invention. The wobble processing circuit of FIG. 3 comprises a set 40 of four adaptive filters FA, FB, FC and FD, a coefficients calculation block 42, and a subtracting unit 44. The elementary signals A, B, C and D are fed to the adaptive filters FA, FB, FC and FD respectively. The subtracting unit outputs an improved wobble signal IPP:

$$IPP=PP-[FA*A+FB*B+FC*C+FD*D].$$

The data signal HF and the improved wobble signal IPP are fed to the coefficients calculation block 42. The coefficients calculation block 42 is responsible for calculating the coefficients of each of the four filters FA, FB, FC and FD by minimizing a cost function J:

$$J(FA, FB, FC, FD)=\{E\ \{IPP\times HF\}\}^2$$

where E{ } is the mathematical expectation. This cost function J gives the cross correlation between the improved wobble signal IPP and the data signal HF.

Classically, the cost function J is minimized by using the gradient algorithm:

$$FA(k+1) = FA(k) + \mu_A \times \left[-\frac{\partial J(FA, FB, FC, FD))}{\partial FA}\right]_{FA=FA(k)}$$

$$FB(k+1) = FB(k) + \mu_B \times \left[-\frac{\partial J(FA, FB, FC, FD))}{\partial FB}\right]_{FB=FB(k)}$$

$$FC(k+1) = FC(k) + \mu_C \times \left[-\frac{\partial J(FA, FB, FC, FD))}{\partial FC}\right]_{FC=FC(k)}$$

$$FD(k+1) = FD(k) + \mu_D \times \left[-\frac{\partial J(FA, FB, FC, FD))}{\partial FD}\right]_{FD=FD(k)}$$

where:

$$-\frac{\partial J(FA, FB, FC, FD)}{\partial FA}, \frac{\partial J(FA, FB, FC, FD)}{\partial FB},$$
$$\frac{\partial J(FA, FB, FC, FD)}{\partial FC}, \text{ and } \frac{\partial J(FA, FB, FC, FD)}{\partial FD}$$

are the gradients of J(FA, FB, FC, FD) with respect to FA, FB, FC and FD respectively, $\mu_A$, $\mu_B$, $\mu_C$, and $\mu_D$ are convergence factors that control the stability and the rate of adaptation, and k is the time index.

In practice, for executing the gradient algorithm, the instantaneous value of $(IPP \times HF)^2$ replaces the mathematical expectation $\{E\{IPP \times HF\}\}^2$ that is unknown a priori.

Figure 4:
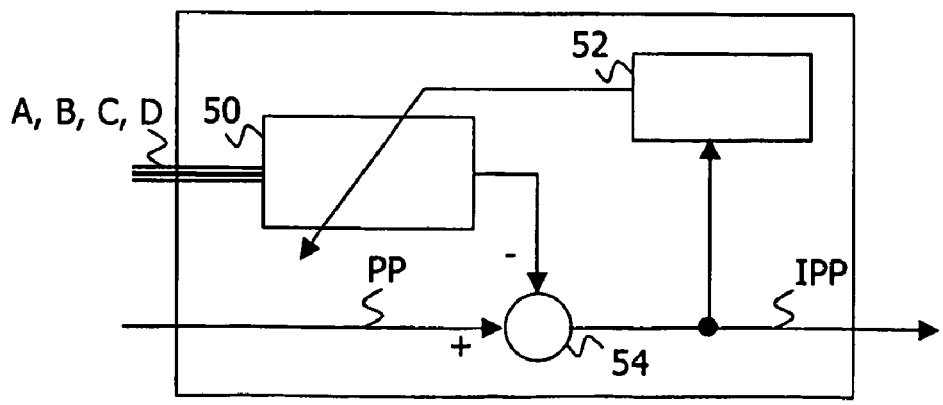
FIG. 4 is a block diagram of a second embodiment of a wobble processing circuit according to the invention.

FIG. 4 is a block diagram of a second embodiment of a wobble processing circuit according to the invention. The wobble processing circuit of FIG. 4 comprises a set 50 of four adaptive filters FA, FB, FC and FD, a coefficients calculation block 52, and a subtracting unit 54. The elementary signals A, B, C and D are fed to the adaptive filters FA, FB, FC and FD, respectively. The subtracting unit outputs an improved wobble signal IPP:

$$IPP=PP-[FA*A+FB*B+FC*C+FD*D].$$

The improved wobble signal IPP is fed to the coefficients calculation block 52. In this embodiment the cost function J to be minimized by the coefficients calculation block 52 is defined as follows:

$$J(FA, FB, FC, FD, q)=E\{(q \times IPP-PP_{REF})^2\} \text{ where:}$$

q is a constant to be decided together with FA, FB, FC and FD by using the gradient algorithm $$q(k+1) = q(k) + \mu_q \times \left[ -\frac{\partial J(FA, FB, FC, FD, q))}{\partial q} \right]_{q=q(k)}$$

and $P_{REF}$ is a reference wobble signal that is reconstructed on the basis of the results of the wobble detection (a result of the wobble detection is a value above zero or below zero for a phase-modulated wobble, a positive value corresponds to a sine wave of one-period while a negative value corresponds to an anti-phase sine wave of one period; by assembling these one period sine waves end to end, an ideal sine wave is rebuilt that is used as the reference signal $PP_{REF}$).

In practice, for executing the gradient algorithm, the instantaneous value of $(q \times IPP - PP_{REF})^2$ replaces the mathematical expectation $\{E\{q \times IPP - PP_{REF}\}\}^2$ that is unknown a priori.

A first alternative embodiment uses two filters FAB and FCD instead of the above sets 40 and 50 of four filters, so that the improved wobble signal IPP is defined by the following relation:

IPP=PP−[FAB*(A+B)+FCD*(C+D)]

A second alternative embodiment uses one single filter F instead of the above sets 40 and 50 of four filters, so that the improved wobble signal IPP is defined by the following relation:

IPP=PP−[F*HF]

These alternative embodiments are used if the four elementary signals A, B, C and D are not individually available (for example if the detector is a two-quadrant detector). They may still be chosen if the four individual elementary signals are available in order to limit the calculations.

Figure 5:
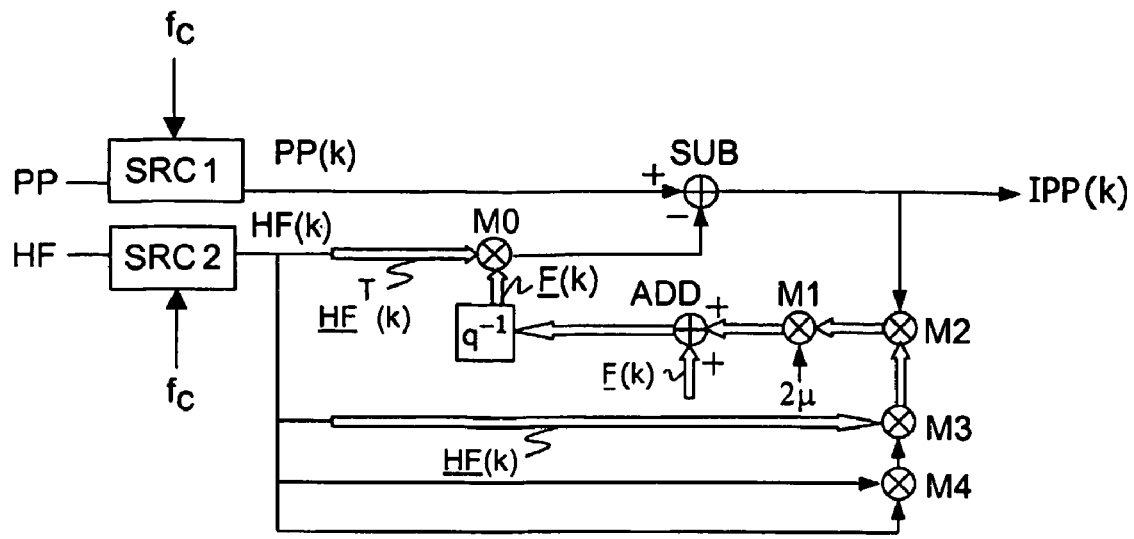
FIG. 5 is a detailed block diagram of an example of wobble processing circuit according to the invention.

FIG. 5 gives an implementation of a wobble processing circuit according to the invention in which a single filter F is used. In the implementation of FIG. 5, the gradient algorithm is executed by replacing the mathematical expectation $\{E\{IPP \times HF\}\}^2$ with the instantaneous value of $(IPP \times HF)^2$ which means that:

$$\underline{F}(k+1) \approx \underline{F}(k) + \mu \left[ -\frac{\partial [IPP(k) \cdot \underline{HF}(k)]^2}{\partial F} \right]_{F=F(k)} \quad (1)$$

where:
$\underline{F}(k)=[F_{-N}(k), \ldots, F_0(k), \ldots, F_N(k)]^T$ is the vector of the coefficients of the filter F at time index k,
$\underline{HF}(k)=[HF(k-N), \ldots, HF(k), \ldots, HF(k+N)]^T$ is the data vector at time index k, $$IPP(k)=PP(k)-\underline{F}(k) \cdot \underline{HF}^T(k) \quad (2)$$

and $[]^T$ denotes the transpose operation.

Equation (1) can be rewritten as follows:

$$\underline{F}(k+1) \approx \underline{F}(k) + 2\mu \cdot HF^2(k) \cdot IPP(k) \cdot \underline{HF}(k) \quad (3)$$

FIG. 5 is a transcription of equations (2) and (3). The wobble processing circuit depicted in FIG. 5 comprises:

a sample rate converters SRC1 for sampling the input wobble signal PP at a frequency $f_c$ advantageously lower than the data bit rate $f_b$, a sample rate converters SRC2 for sampling the data signal HF at a frequency $f_c$ advantageously lower than the data bit rate $f_b$, multiplication means M0 for multiplying the data vector $\underline{HF}^T(k)$ with the vector of the filter coefficients $\underline{F}(k)$, subtracting means SUB for subtracting the number generated by the multiplication means M0 from the input wobble sample PP(k), thereby generating the improved wobble sample IPP(k), addition means ADD, delay means $q^{-1}$, multiplication means M1-M2-M3-M4 for implementing the recursive calculation of the adaptive filter coefficients.

Advantageously, the cross-talk cancelling according to the invention may work at a frequency $f_c$ lower than the data bit rate $f_b$. The sampling rate $f_c$ can be chosen smaller than $f_b$ as long as the performance of the wobble detection is not degraded. The lower the sampling rate for the wobble signal the less the coefficients to describe the filter(s). Therefore by reducing the sampling rate, the number of coefficients can be reduced as well, which leads to a decrease of both the complexity of the implementation and the power consumption.

In particular, dealing with DVD+RW disc format, the input wobble signal PP and the data signal HF are advantageously sampled at a frequency $f_c=f_b/4$, i.e. four times lower than the data bit rate $f_b$. In these conditions, the filter(s) may comprise three coefficients only.

Preferable, for the DVD+RW format, the embodiment of FIG. 5 will be used, where the filter F has three coefficients only: $F_{-1}(k)$, $F_0(k)$ and $F_1(k)$ with $F_{-1}(0)=1$, $F_0(0)=0$ and $F_1(0)=-1$ as initial values. Alternatively, more coefficient may be used, some of them being non-adaptive. The number of coefficients defining the filter F varies according to the sampling frequency and the cause of cross talk. In particular, the span N decreases as the sampling frequency $f_c$ decreases compared to the data bit rate $f_b$.

Figure 6:
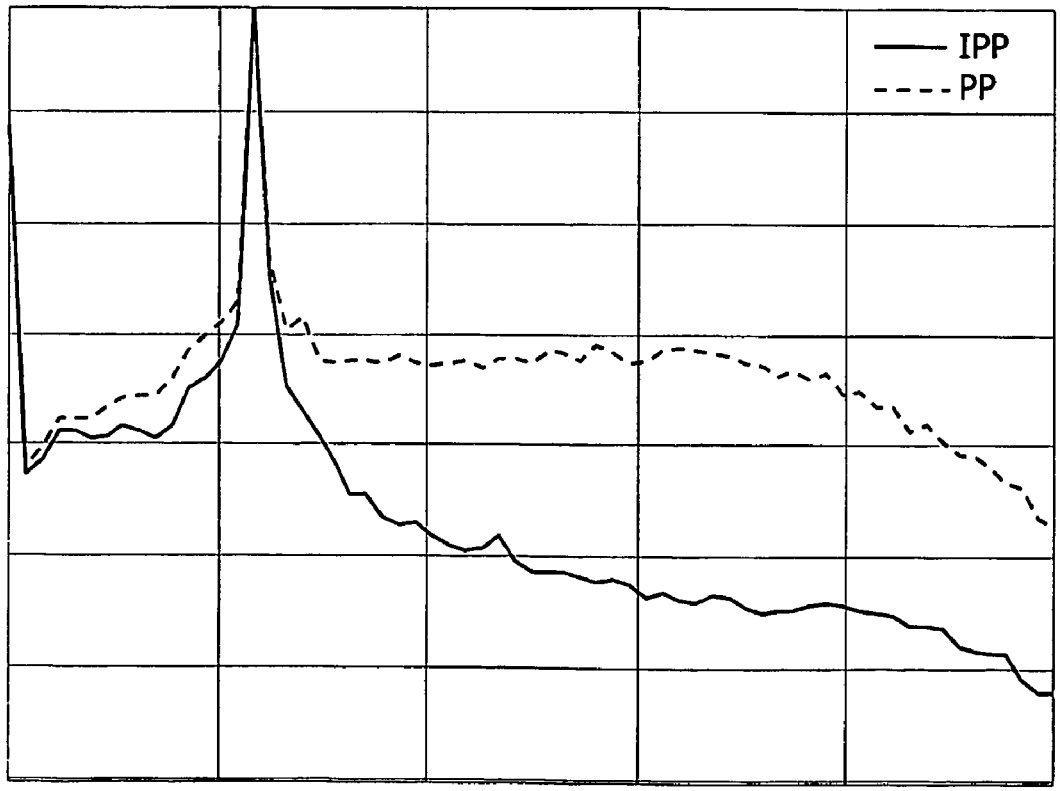
FIG. 6 is a typical example of the frequency spectrum of a wobble signal before and after the processing according to the invention.

In FIG. 6 the general form of the frequency spectrum of a wobble signal PP and its corresponding improved wobble signal IPP are represented (the Y-axis indicates the power and the X-axis indicates the frequency). It can be seen from these curves that the noise is significantly decreased over the full bandwidth in the improved wobble signal.

It is to be noted that the wobble processing method of the invention can be implemented either in hardware or in software on a digital signal processor.

With respect to the described processing method, optical unit, and reading/writing apparatus, modifications or improvements may be proposed without departing from the scope of the invention. The invention is thus not limited to the examples provided.

In the embodiment described with reference to FIG. 2, the wobble is a modulated signal used to carry location information but not for tracking. This is not restrictive. The data-to-wobble crosstalk is due to radial asymmetry introduced in the diffraction pattern on the detector. This asymmetry is independent of the wobble itself. It appears in pure periodic wobbles as well as in frequency or phase-modulated wobbles. Thus the invention is applicable independently of the type of wobble signal (pure periodic or modulated wobble signal) and independently of the way the wobble signal is used in the reading and/or writing apparatus (used for tracking and/or carrying information).

The invention is not limited to the above-mentioned cost functions. Any cost function indicating the amount of data leakage to the wobble signal may be used.

The embodiment of FIGS. 2, 3 and 4 use a quadruple photo detector. This is not restrictive. For example, a double photo detector having a dividing line running parallel to the direction of the tracks to be scanned may be used instead of a quadruple photo detector.

The word "comprising" does not exclude the presence of other elements or steps than those listed in the claims.

The invention claimed is:

1. An apparatus for reading and/or writing data from and/or onto a data carrier, said data carrier containing wobbled tracks, said apparatus comprising:
   scanning means for scanning said tracks;
   detection means for detecting at least two elementary signals when scanning said tracks;
   wobble recovery means for generating a wobble signal from said at least two elementary signals; and
   wobble processing means for filtering said at least two elementary signals with at least an adaptive filter and for generating an improved wobble signal by subtracting said filtered elementary signals from said wobble signal,
   said apparatus further comprising:
   data recovery means for generating a data signal from said at least two elementary signals, wherein said adaptive filter uses filtering coefficients chosen so as to minimize the cross-correlation between said improved wobble signal and said data signal, and wherein said filtering coefficients are updated by using an iterative gradient algorithm minimizing a cost function having an instantaneous value equal to the instantaneous value of the squared product of said improved wobble signal and said data signal.

2. The apparatus as claimed in claim 1, wherein said adaptive filter uses filtering coefficients chosen so as to minimize the difference between a scaled version of the improved wobble signal and a reference wobble signal reconstructed on the basis of the generated wobble signal.

3. An optical unit comprising:
   scanning means for scanning wobbled tracks of a data carrier;
   detection means for detecting at least two elementary signals when scanning said tracks;
   wobble recovery means for generating a wobble signal from said at least two elementary signals; and
   wobble processing means for filtering said at least two elementary signals with at least an adaptive filter and for generating an improved wobble signal (IPP) by subtracting said filtered elementary signals from said wobble signal,
   said optical unit further comprising:
   data recovery means for generating a data signal from said at least two elementary signals, wherein said adaptive filter uses filtering coefficients chosen so as to minimize the cross-correlation between said improved wobble signal and said data signal, and wherein said filtering coefficients are updated by using an iterative gradient algorithm minimizing a cost function having an instantaneous value equal to the instantaneous value of the squared product or said improved wobble signal and said data signal.

4. The optical unit as claimed in claim 3, wherein said adaptive filter uses filtering coefficients chosen so as to minimize the difference between the improved wobble signal and a reference wobble signal reconstructed on the basis of the generated wobble signal.

5. A wobble processing method for processing a wobble signal generated from at least two elementary signals detected by scanning of a wobbled track of a data carrier, comprising the steps of:
   filtering said at least two elementary signals with at least an adaptive filter; and
   subtracting said filtered elementary signals from said wobble signal, thereby generating an improved wobble signal,
   wherein said filtering step uses filtering coefficients chosen so as to minimize the cross-correlation between said improved wobble signal and a data signal generated from said at least two elementary signals,
   and wherein said filtering coefficients are updated by using an iterative gradient algorithm minimizing a cost function having an instantaneous value equal to the instantaneous value of the squared product or said improved wobble signal and said data signal.

6. The wobble processing method as claimed in claim 5, wherein said filtering step uses filtering coefficients chosen so as to minimize the difference between a scaled version of the improved wobble signal and a reference wobble signal reconstructed on the basis of the generated wobble signal.

7. A computer-readable medium having a program comprising instructions for implementing a wobble processing method as claimed in claim 5 or 6, when said program is executed by a processor.

8. The apparatus as claimed in claim 1, wherein said apparatus further comprises sampling means for sampling said at least two elementary signals at a frequency lower than the data bit rate.

* * * * *